US012586795B2

(12) United States Patent
Orfanidi et al.

(10) Patent No.: US 12,586,795 B2
(45) Date of Patent: Mar. 24, 2026

(54) METHOD FOR PRODUCING A CATALYST MATERIAL FOR AN ELECTRODE OF AN ELECTROCHEMICAL CELL

(71) Applicant: Bayerische Motoren Werke Aktiengesellschaft, Munich (DE)

(72) Inventors: Alin Orfanidi, Munich (DE); Sebastian Ott, Constance (DE); Peter Strasser, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 587 days.

(21) Appl. No.: 18/017,320

(22) PCT Filed: Jul. 9, 2021

(86) PCT No.: PCT/EP2021/069145
§ 371 (c)(1),
(2) Date: Jan. 20, 2023

(87) PCT Pub. No.: WO2022/017830
PCT Pub. Date: Jan. 27, 2022

(65) Prior Publication Data
US 2023/0290964 A1     Sep. 14, 2023

(30) Foreign Application Priority Data
Jul. 21, 2020    (DE) ..................... 10 2020 119 154.5

(51) Int. Cl.
*H01M 4/92*          (2006.01)
*H01M 4/80*          (2006.01)
*H01M 4/86*          (2006.01)

(52) U.S. Cl.
CPC ........... *H01M 4/926* (2013.01); *H01M 4/801* (2013.01); *H01M 2004/8689* (2013.01)

(58) Field of Classification Search
CPC ....... C01B 32/20; H01M 4/926; H01M 4/801; H01M 2004/8689
USPC ...... 429/524; 502/181, 185; 423/445 R, 448, 423/449.1, 460
See application file for complete search history.

(56) References Cited

U.S. PATENT DOCUMENTS

| | | | | |
|---|---|---|---|---|
| 2004/0121221 | A1 * | 6/2004 | Suzuki ................... | B82Y 30/00 502/185 |
| 2016/0211529 | A1 | 7/2016 | Kurungot et al. | |
| 2016/0240861 | A1 | 8/2016 | Kurungot et al. | |
| 2017/0005342 | A1 * | 1/2017 | Kim ................... | H01M 4/8817 |

FOREIGN PATENT DOCUMENTS

| | | | | | |
|---|---|---|---|---|---|
| CN | 102487142 | A | | 6/2012 | |
| CN | 108855184 | A | * | 11/2018 | ............... C25B 1/04 |
| CN | 109761235 | A | | 5/2019 | |
| CN | 110248731 | A | | 9/2019 | |
| CN | 111224112 | A | * | 6/2020 | .............. H01M 4/88 |
| CN | 114188511 | A | * | 3/2022 | ............ H01M 4/583 |
| JP | 2010-287316 | A | | 12/2010 | |
| JP | 2015-220036 | A | | 12/2015 | |
| JP | 2018034138 | A | * | 3/2018 | .............. B01J 27/24 |
| KR | 20230040661 | A | * | 3/2023 | ............ H01M 4/926 |
| WO | WO 2018/120067 | A1 | | 7/2018 | |

OTHER PUBLICATIONS

Michio Inagaki et al., "Nitrogen-doped carbon materials." Carbon 132, pp. 104-140. (Year: 2018).*
Christian Kensy et al., "Scalable production of nitrogen-doped carbons for multilayer lithium-sulfur battery cells." Carbon 161, pp. 190-197. (Year: 2020).*
English translation of Written Opinion for PCT/EP2021/069145. (Year: 2021).*
International Search Report (PCT/ISA/210) issued in PCT Application No. PCT/EP2021/069145 dated Nov. 11, 2021 with English translation (four (4) pages).
German-language Written Opinion (PCT/ISA/237) issued in PCT Application No. PCT/EP2021/069145 dated Nov. 11, 2021 (five (5) pages).
German-language Search Report issued in German Application No. 10 2020 119 154.5 dated Jan. 11, 2021 with partial English translation (11 pages).
Ott et al., "Ionomer distribution control in porous carbon-supported catalyst layers for high-power and low Pt-loaded proton exchange membrane fuel cells," Nature Materials, Jan. 2020, pp. 77-85, vol. 19, No. 1 (nine (9) pages).
Li et al., "Formation of Nitrogen-Doped Mesoporous Graphitic Carbon with the Help of Melamine," ACS Applied Materials & Interfaces, 2014, pp. 20574-20578, vol. 6 (five (5) pages).
Kim et al., "Nitrogen and oxygen dual-doping on carbon electrodes by urea thermolysis and its electrocatalytic significance for vanadium redox flow battery," Electrochimica Acta, 2020, pp. 1-13, vol. 348 (13 pages).
Jaouen et al., "Non-noble Electrocatalysts for O₂ Reduction: How Does Heat Treatment Affect Their Activity and Structure? Part I. Model for Carbon Black Gasification by NH₃: Parametric Calibration and Electrochemical Validation," J. Phys. Chem. C, 2007, pp. 5963-5970, vol. 111 (eight (8) pages).

(Continued)

*Primary Examiner* — Patricia L. Hailey
(74) *Attorney, Agent, or Firm* — Crowell & Moring LLP

(57)                ABSTRACT

A method for producing a catalyst material for an electrode of an electrochemical cell includes doping a carbon material with nitrogen atoms, where the doping includes: bringing a carbon material into contact with urea at a temperature in a temperature range from 750° C. to 850° C.; bringing an oxidized carbon material into contact with cyanamide at a temperature in a temperature range from 550° C. to 650° C.; or bringing an oxidized carbon material into contact with melamine at a temperature in a temperature range from 550° C. to 650° C.

14 Claims, 2 Drawing Sheets

(56) References Cited

OTHER PUBLICATIONS

Tachibana et al., "Highly porous nitrogen-doped carbon nanoparticles synthesized via simple thermal treatment and their electrocatalytic activity for oxygen reduction reaction," Carbon, 2017, pp. 515-525, vol. 115, XP029924135 (45 pages).

Yang, et al., "Nitrogen-doped carbon black supported Pt-M (M=Pd, Fe, Ni) alloy catalysts for oxygen reduction reaction in proton exchange membrane fuel cell," Materials Today Energy, 2019, pp. 374-381, vol. 13, XP055856126 (eight (8) pages).

Shi, et al., "Nitrogen-doped ordered mesoporous carbons based on cyanamide as the dopant for supercapacitor," Carbon, 2015, pp. 335-346, vol. 84 (28 pages).

Chinese-language Office Action issued in Chinese Application No. 202180060660.7 dated Jul. 29, 2025, with English translation (17 pages).

* cited by examiner

METHOD FOR PRODUCING A CATALYST MATERIAL FOR AN ELECTRODE OF AN ELECTROCHEMICAL CELL

BACKGROUND AND SUMMARY

The present invention relates to a process for producing a catalyst material for an electrode of an electrochemical cell.

Electrochemical cells, such as fuel cells or electrolysis cells, are increasingly being used as an energy source. One of the most common problems of electrochemical cells is their high power loss over time. This is particularly evident in low-temperature fuel cells, which have a lower catalyst loading, which may cause an inhomogeneous ionomer distribution. In order to achieve a homogeneous ionomer distribution, an attempt has been made to incorporate nitrogen atoms into the carbon skeleton of a carbon support for the catalyst. For this purpose, a carbon material was reacted with gaseous $NH_3$ (see, for example, Sebastian Ott et al.: "Ionomer distribution control in porous carbon-supported catalyst layers for high-power and low Pt-loaded proton exchange membrane fuel cells", Nature Materials, January 2020, doi.org/10.1038/s41563-019-0487-0 or F. Jaouen et al.: "Non-noble Electrocatalysts for 02 Reduction: How Does Heat Treatment Affect Their Activity and Structure? Part I. Model for Carbon Black Gasification by $NH_3$: Parametric Calibration and Electrochemical Validation", J. Phys. Chem. C 2007, 111, 5963-5970, 1 December, 2006). However, it has been shown that an electrode produced using the carbon material reacted with $NH_3$ could not provide sufficiently high performance.

Starting from this prior art, an object of the present disclosure is therefore to specify a process for producing a catalyst material for an electrode of an electrochemical cell with which a sustained high performance can be achieved in an electrochemical cell.

The object may be achieved by a process according to the independent claims. The dependent claims deal with advantageous further developments and configurations of the invention.

Accordingly, the object may be achieved by a process comprising a step of doping a carbon material with nitrogen atoms. The doping can be carried out in various ways, namely firstly by bringing the carbon material into contact with urea at a temperature in a temperature range of 750° C. to 850° C. or by bringing an oxidized carbon material into contact with cyanamide at a temperature in a temperature range of 550° C. to 650° C. or by bringing an oxidized carbon material into contact with melamine at a temperature in a temperature range of 550° C. to 650° C.

It may be important to maintain the specified temperature ranges for the different dopants in order to achieve maximum power density in an electrochemical cell that also remains stable over a long period of time. The doping of oxidized carbon material using cyanamide is particularly advantageously carried out at a temperature around 600° C. and the doping using melamine is particularly advantageously carried out at a temperature around 600° C. This allows further increases in power density to be achieved in an electrochemical cell.

When using melamine as nitrogen dopant or using cyanamide at a doping temperature of 600° C., it may also be required that the carbon material is oxidized, i.e., the carbon material is oxidized prior to doping.

A carbon material doped with nitrogen atoms produced in this manner is a high-performance support for catalysts such as those commonly used in electrochemical cells. By doping the carbon material with nitrogen atoms, nitrogen atoms are directly incorporated into the carbon skeleton. $NH_x$ groups are formed, which are positively charged during the production of the catalyst material or the electrode and can thus react with the mostly negatively charged groups (particularly $SO_3$ groups) of an ionomer also used in the production of the electrode under strong Coulomb interaction, which leads to a very homogeneous distribution of the ionomer, whereby a sustained high power density can be achieved.

The carbon material doped with nitrogen atoms by the process according to the invention is used for producing a catalyst for an electrode of an electrochemical cell. The catalyst in this case is used, for example, as a catalyst ink, which is applied for example directly to a membrane and therefore can form an electrode. The catalyst is thus coated directly on the membrane.

According to an advantageous further development, the doping of the carbon material with nitrogen atoms may be carried out in a tubular oven, since the doping reaction can be controlled particularly well and resources can be conserved.

The doping of the carbon material with nitrogen atoms may be further advantageously carried out for 1.5 to 12 hours, particularly for 2 to 7 hours and especially for 2 to 4 hours. Too short doping times of less than 1.5 hours may lead to insufficient nitrogen doping, whereas too long doping times not only bring economic disadvantages by increasing reaction times, but can also lead to decomposition of the carbon material. Doping times of 2 to 4 hours and especially of about 2.5 hours are particularly preferred to overcome the above disadvantages.

Due to very good conductivities with high temperature stability, the carbon material is preferably selected from carbon black, graphite and graphitized carbon. Exemplary carbon materials are obtainable under the trade name Ketjen Black. Also, suitable carbon black may have a low specific surface area of less than 200 $m^2$/g carbon, or an intermediate specific surface area of 250 to 600 $m^2$/g carbon, or a high specific surface area of more than 600 $m^2$/g carbon. Suitable graphitized carbon may have a low specific surface area of less than 200 $m^2$/g carbon, or an intermediate specific surface area of 250 to 600 $m^2$/g carbon, or a high specific surface area of more than 600 $m^2$/g carbon. The specific surface area is determined in each case by gas adsorption isotherms by the BET method.

In order to remove any reaction residues from the doping reaction, a washing step of the doped carbon material with water can advantageously be provided. The doped carbon material after washing may also be dried prior to further processing or storage.

In order to further improve the power density of an electrode produced with the doped carbon material in an electrochemical cell, it is provided that, when cyanamide is used for doping, the carbon material may be oxidized prior to doping with nitrogen atoms.

The oxidation of the carbon material, for example for doping with melamine but also doping with cyanamide at 550° C. to 650° C., may be carried out by reacting the carbon material with a 70% by weight aqueous $HNO_3$ solution under reflux. The reaction time for this may be advantageously 15 minutes to 3 hours and especially 30 minutes to 60 minutes.

To improve the catalytic properties of the catalyst material for an electrode of an electrochemical cell, preferably a catalytically active metal, such as in particular platinum and/or a platinum-containing alloy, may be added to the carbon material doped with nitrogen atoms. By means of the process according to the disclosure, the pore structure of mesopores and micropores of the carbon material is almost completely preserved, so that the catalytically active metal can be very readily impregnated and may adhere permanently and stably to the carbon material, whereby the power density of an electrochemical cell can be further increased.

For the reasons above, it is therefore also advantageous that a platinum or platinum-containing alloy content, based on the total weight of the carbon material doped with nitrogen atoms, may be 5 to 50% by weight.

In order to provide particularly good binding to the ionomer, doping of the carbon material with nitrogen atoms may be advantageously carried out such that the carbon material is doped with 0.4% by weight to 2% by weight, especially with 0.8% by weight to 1.5% by weight nitrogen.

The electrode is particularly advantageously formed as cathode and further advantageously as cathode for a fuel cell.

melamine, urea or cyanamide). Also shown in the table below are the ratios of carbon to nitrogen source.

The mixture was then heated in a tubular oven under constant nitrogen flow at the respective specified temperatures (see $T_{set}°$ C.) at a heating rate of 400 K/h and maintained for 2.5 hours.

Subsequently, a catalyst was produced using the oxidized and doped carbon by depositing platinum on the respective carbon by means of a polyol process. The polyol process comprised mixing 300 mg of functionalized carbon with 200 ml of ethylene glycol, 100 ml of deionized water and 1.35 ml of a 0.25 mol/L concentrated $H_2PtCl_6$ solution. The resulting dispersion was first stirred at 25° C. for 18 hours and then at 120° C. under reflux for 2 hours. After completion of the reaction, the catalyst was filtered off and washed with hot water in order to remove reaction residues and traces of chloride. The resulting catalyst powder was then dried in a vacuum oven.

The tables below give an overview of the tests carried out:

| Nitrogen source | Melamine | | | Cyanamide | | | Urea | | |
|---|---|---|---|---|---|---|---|---|---|
| Temperature [° C.] | 600 | 600 | 800 | 600 | 600 | 800 | 600 | 600 | 800 |
| Oxidation with HNO$_3$ | No | Yes | No | No | Yes | No | No | Yes | No |
| % by weight nitrogen | 0.93 | 1.13 | 0.73 | 0.95 | 1.29 | 0.78 | 0.90 | 1.29 | 0.60 |
| Mol of nitrogen source/mol of carbon | 6.9 | 3.4 | 43.0 | 6.0 | 2.9 | 30.4 | 56.2 | 29.6 | 154.8 |

BRIEF DESCRIPTION OF THE DRAWINGS

Further details, features and advantages of the invention are apparent from the following description and figures. Shown are.

DETAILED DESCRIPTION OF THE DRAWINGS

Figure 1:
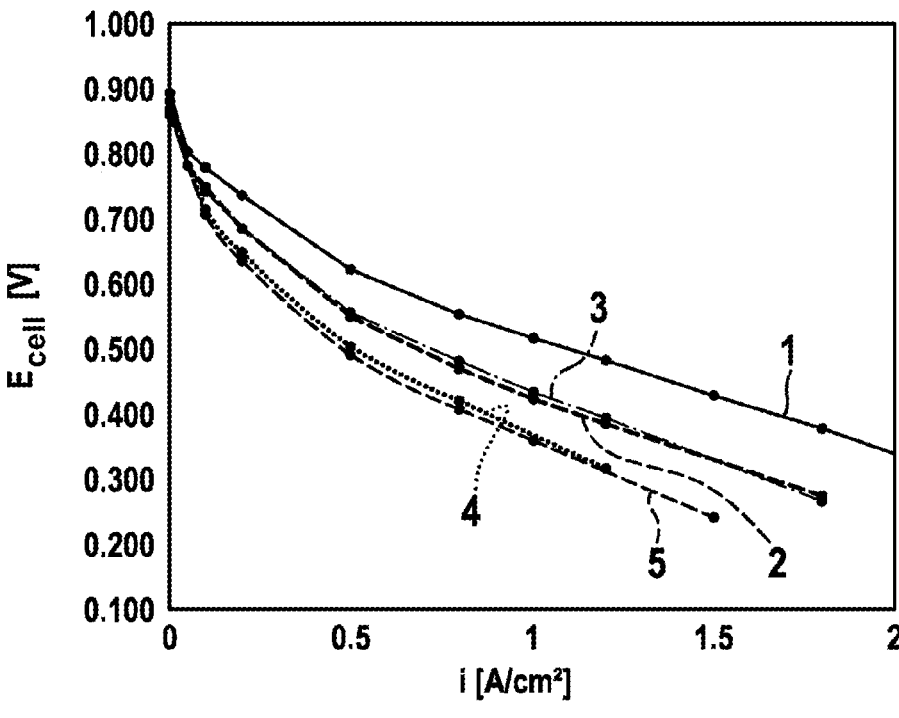
FIG. 1 a diagram illustrating power densities of an electrochemical cell using carbon materials doped with various dopants at 600° C., FIG. 2 a diagram illustrating power densities of an electrochemical cell using carbon materials doped with various dopants at 800° C.

The diagram in FIG. 1 shows in detail the power densities i of electrochemical cells, measured in A/cm$^2$ against the voltage in volts. The temperature of the cell was 90° C. and the pressure was 170 kPa$_{a,c}$. Unless explicitly defined otherwise, all % figures refer to % by weight (wt %).

The cell was produced as follows:

1. Catalyst Production

Firstly, commercially available Ketjenblack EC-300J (manufacturer: Akzo Nobel) was stirred under reflux with 100 ml of aqueous 70% by weight HNO$_3$ solution for 0.5 hours, wherein an oil bath heated at a temperature of 70° C. was used to produce the reflux. After the reaction time, the oxidized carbon was filtered and washed with hot water in order to remove all acid residues. The oxidized carbon was then dried in an oven.

Subsequently, the oxidized carbon (see the table below for details) was mixed with various nitrogen sources (i.e. with 2. Cell Production All membrane electrode assemblies produced were produced using a decal transfer process. For this purpose, catalyst inks were produced by mixing a catalyst powder as prepared above with water followed by 1-propanol and at least one ionomer dispersion containing water (725 EW 3M dry powder dispersed in 40% $H_2O$/60% 1-propanol, which resulted in an 18% by weight ionomer solution). The catalyst inks were then coated on PTFE using a Mayer rod. The coated decal was then dried.

For both electrodes, the ionomer carbon ratio by weight (I/C) was adjusted to 0.65. For the cathode catalyst, the catalyst with the modified nitrogen was used (melamine, urea, cyanamide), with 20% by weight Pt deposited on the carbon support. The % by weight nitrogen of all carbons ranged in a range between 0.8 to 1.2% by weight nitrogen.

All anode electrodes comprised 30% by weight Pt on graphitized Ketjenblack (TEC10EA30E, sold by Tanaka Kikinzoco).

The Pt loading of the cathode electrodes was 0.11 mg$_{Pt}$/cm$^2$ with a nominal layer thickness of about 14 μm when 20% by weight PUC-modified (=N-doped carbon) was used. All anodes were loaded with about 0.1 mg$_{Pt}$/cm$^2$ when 30% by weight Pt/C (non-modified carbon=non N-doped carbon) was used.

5 cm$^2$ MEAs were produced by hot-pressing a 10 μm thick membrane (Gore MX20.10) disposed between the anode decals and cathode decals as produced above at 155° C. for 3 minutes and subsequent application of force of 0.24 kN/cm$^2$. The MEAs were then laminated between two seals (200×200 mm, 25 μm PEN film, CMC 61325 coated with a heat-activatable adhesive (approximate thickness: 15 μm) from CMC Klebetechnik, Germany), resulting in an active MEA surface area of 5 cm$^2$ (50×10 mm).

All tests were conducted using a single cell test station using modified single cell hardware (Tandem Technologies Ltd.) equipped with 14 graphite channel composite flow fields containing serpentine channels. The contact pressure of the cell was set to 9 bar and the compression of the gas diffusion layers (SGL 29BC in both electrodes, anode and cathode) was set to 20% using non-compressible glass fibre PTFE seals (Fiberflon).

Figure 2:
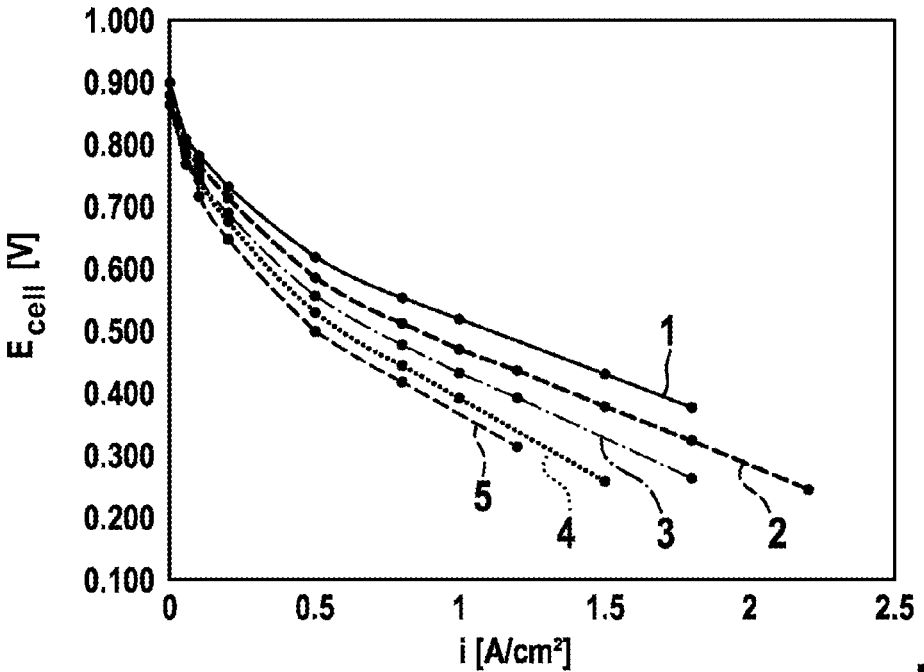
Figure 3:
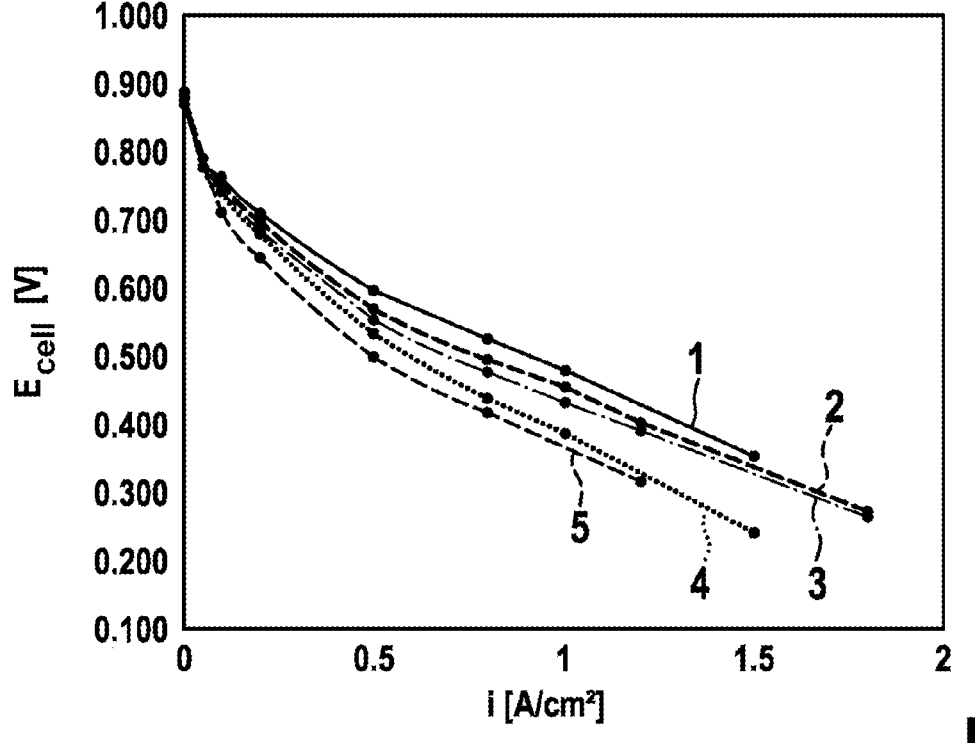
FIG. 3 a diagram illustrating power densities of an electrochemical cell using oxidized carbon materials doped with various dopants at 600° C.

The polarization curves of FIGS. 1 to 3 were recorded at a cell temperature of 90° and a relative humidity (RH) at 30% RH.

The flow remained constant at 1000 nccm $H_2$ on the anode side and 2000 nccm air on the cathode side, while the outlet pressure was set to 170 kPa on both sides. The very small amount of water produced and the excess of reaction gases ensured that the inlet humidity (RH) corresponded to the outlet humidity (RH), also taking into account a pressure drop across the active area of the MEA of about 1 kPa.

FIG. 1 shows a diagram illustrating the power densities of an electrochemical cell using carbon materials doped at 600° C. with different dopants.

Curve 1 shows the test results of an electrochemical cell in which a carbon material was used which had been doped with urea at a temperature of 600° C.

Curve 2 shows the test results of an electrochemical cell in which a carbon material was used which had been doped with melamine at a temperature of 600° C.

Curve 3 shows the test results of an electrochemical cell in which a carbon material was used which had been doped with $NH_3$ at a temperature of 600° C.

Curve 4 shows the test results of an electrochemical cell in which the same carbon material was used as in the electrochemical cells above but without nitrogen doping.

Curve 5 shows the test results of an electrochemical cell in which a carbon material was used which had been doped with cyanamide at a temperature of 600° C.

From the diagram in FIG. 1, it can be deduced that the use of carbon material doped with urea at 600° C. achieves significantly better and thus higher power densities than all other doped carbon materials and in particular also the carbon material doped with $NH_3$, which serves as a comparative example.

FIG. 2 shows a diagram in which the power densities of electrochemical cells i, measured in A/cm$^2$, is plotted against the voltage in volts. The electrochemical cells were produced and measured analogously to those in FIG. 1.

Curve 1 shows the test results of an electrochemical cell in which a carbon material was used which had been doped with cyanamide at a temperature of 800° C.

Curve 2 shows the test results of an electrochemical cell in which a carbon material was used which had been doped with urea at a temperature of 800° C.

Curve 3 shows the test results of an electrochemical cell in which a carbon material was used which had been doped with $NH_3$ at a temperature of 800° C.

Curve 4 shows the test results of an electrochemical cell in which a carbon material was used which had been doped with melamine at a temperature of 800° C.

Curve 5 shows the test results of an electrochemical cell in which the same carbon material was used as in the electrochemical cells above but without nitrogen doping.

From the diagram in FIG. 2, it can be deduced that the use of carbon material doped with urea and cyanamide at 800° C. achieves significantly better and thus higher power densities than all other doped carbon materials and in particular also the carbon material doped with $NH_3$, which serves as a comparative example. In addition, carbon materials from all doping materials showed advantageous improvements in power densities compared to the undoped carbon material.

FIG. 3 shows a diagram in which the power densities of electrochemical cells i, measured in A/cm$^2$, is plotted against the voltage in volts. The electrochemical cells were produced and measured analogously to those in FIG. 1, but with the difference that the carbon material was oxidized prior to doping, namely with a 70% by weight aqueous $HNO_3$ solution under reflux for 30 minutes, in which the oxidized carbon material was washed prior to doping in order to remove residues of the oxidation reagents.

Curve 1 shows the test results of an electrochemical cell in which an oxidized carbon material was used which had been doped with cyanamide at a temperature of 600° C.

Curve 2 shows the test results of an electrochemical cell in which an oxidized carbon material was used which had been doped with melamine at a temperature of 600° C.

Curve 3 shows the test results of an electrochemical cell in which an oxidized carbon material was used which had been doped with $NH_3$ at a temperature of 600° C.

Curve 4 shows the test results of an electrochemical cell in which an oxidized carbon material was used which had been doped with melamine at a temperature of 600° C.

Curve 5 shows the test results of an electrochemical cell in which the same oxidized carbon material was used as in the electrochemical cells above but without nitrogen doping.

From the diagram in FIG. 3, it can be deduced that the use of oxidized carbon material doped with cyanamide or melamine at 600° C. achieves significantly better and thus higher power densities than all other oxidized and doped carbon materials and in particular also the carbon material doped with $NH_3$, which serves as a comparative example. In addition, oxidized carbon materials from all doping materials showed advantageous improvements in power densities compared to oxidized but non-doped carbon material.

The invention claimed is:

1. A process for producing a catalyst material for an electrode of an electrochemical cell, the process comprising:
   doping a carbon material with nitrogen atoms, the doping including:
   bringing an oxidized carbon material into contact with cyanamide and heating to a single temperature, the single temperature being in a temperature range of 550° C. to 650° C.; or
   bringing an oxidized carbon material into contact with melamine and heating at to a single temperature, the single temperature being in a temperature range of 550° C. to 650° C.

2. The process according to claim 1, wherein the doping of the carbon material with nitrogen atoms is carried out in a tubular oven.

3. The process according to claim 1, wherein the doping of the carbon material with nitrogen atoms is carried out for 1.5 to 12 hours.

4. The process according to claim 3, wherein the doping of the carbon material with nitrogen is carried out for 2 to 7 hours.

5. The process according to claim 4, wherein the doping of the carbon material with nitrogen is carried out for 2 to 4 hours.

6. The process according to claim 1, wherein the carbon material is selected from the group consisting of carbon black, graphite, and graphitized carbon.

7. The process according to claim 1, further comprising, after doping the carbon material with nitrogen atoms, washing the doped carbon material with water.

8. The process according to claim 1, further comprising oxidizing the carbon material to form the oxidized carbon material.

9. The process according to claim 8, wherein the oxidation of the carbon material is carried out by reacting the carbon material with a 70% by weight aqueous $HNO_3$ solution under reflux.

10. The process according to claim 1, further comprising, after doping the carbon material with nitrogen atoms, adding platinum or a platinum-containing alloy to the carbon material doped with nitrogen atoms.

11. The process according to claim 10, wherein a platinum or platinum-containing alloy content, based on the carbon material doped with nitrogen atoms, is 5 to 50% by weight.

12. The process according to claim 1, wherein the doping of the carbon material with nitrogen atoms is carried out such that the carbon material is doped with 0.4% by weight to 2% by weight nitrogen.

13. The process according to claim 12, wherein the doping of the carbon material with nitrogen atoms is carried out such that the carbon material is doped with 0.8% by weight to 1.5% by weight nitrogen.

14. The process according to claim 1, wherein the electrode is formed as cathode.

* * * * *